United States Patent [19]

Petit et al.

[11] Patent Number: 4,949,794
[45] Date of Patent: Aug. 21, 1990

[54] REMOTELY CONTROLLED FIREFIGHTING APPARATUS AND CONTROL MEANS

[75] Inventors: Kevin J. Petit; Eugene E. Dettra, both of Wooster; Richard L. Beery, Shreve; Jeffrey T. Orin, Canton, all of Ohio

[73] Assignee: Premier Industrial Corporation, Cleveland, Ohio

[21] Appl. No.: 200,572

[22] Filed: May 31, 1988

[51] Int. Cl.$^5$ .................. A62C 37/00; A62C 37/08; B05B 15/08
[52] U.S. Cl. ............................. 169/52; 169/25; 169/70; 239/69; 239/587
[58] Field of Search .................. 169/51–53, 169/24, 25, 61, 70; 239/69, 587; 901/43; 364/167.01, 190

[56] References Cited

U.S. PATENT DOCUMENTS

| | | | |
|---|---|---|---|
| 2,417,655 | 3/1947 | Lindsay | 169/70 X |
| 2,729,295 | 1/1956 | Edwards | 169/25 |
| 2,729,296 | 1/1956 | Gurney | 169/25 |
| 2,753,003 | 7/1956 | Gurney et al. | 169/25 |
| 2,984,422 | 5/1961 | Vogt et al. | 169/25 X |
| 3,010,519 | 11/1961 | Gillespie | 169/25 |
| 3,074,649 | 1/1963 | Atkinson | 239/587 X |
| 3,106,247 | 10/1963 | Lacks et al. | 169/25 |
| 3,554,452 | 1/1971 | Davidson | 169/24 X |
| 3,606,162 | 9/1971 | Lehmann | 239/69 X |
| 3,762,478 | 10/1973 | Cummins | 169/24 |
| 3,770,062 | 11/1973 | Riggs | 169/24 |
| 4,007,793 | 2/1977 | Hux et al. | 169/25 |
| 4,189,005 | 2/1980 | McLoughlin | 169/24 |
| 4,233,491 | 11/1980 | Maruyama | 901/48 X |
| 4,348,634 | 9/1982 | David et al. | 901/43 X |
| 4,535,846 | 8/1985 | Gagliardo et al. | 169/25 |
| 4,614,300 | 9/1986 | Falcoff | 239/69 X |
| 4,616,782 | 10/1986 | Marietta et al. | 901/43 X |
| 4,762,013 | 8/1988 | Peter et al. | 901/43 X |

FOREIGN PATENT DOCUMENTS 3620603 1/1987 Fed. Rep. of Germany ........ 169/24
1029062 5/1953 France ............................. 169/70

Primary Examiner—Joseph F. Peters, Jr.
Assistant Examiner—James M. Kannofsky
Attorney, Agent, or Firm—Jones, Day, Reavis & Pogue

[57] ABSTRACT

Control apparatus for selectively generating and converting control input information into controlling output for position and movement of controlled apparatus. The controlled apparatus includes a fluid discharge device comprising a nozzle disposed for vertical and horizontal movement.

The control apparatus comprises a control input, which further comprises a controlled apparatus position indicator, a joystick, a controlled apparatus position limit, and a switch for selecting manual and automatic position and movement; a computer, which further comprises a microprocessor; a memory for storing program, a device for receiving controlled apparatus position information and a device for generating and communicating electrical signals; first and second controlled apparatus position determining devices; first and second control remotely controlled electrically operating drive motors for adjusting and controlling movement to the controlled apparatus, and first and second current sensing devices interposed between said computer and said drive motors.

A remotely controlled firefighting apparatus comprising a fluid discharge device comprising a nozzle disposed for horizontal and vertical movement and the control apparatus of the invention further comprises gearing and stop apparatus effective in maximizing accuracy of control, positioning and movement through said electrically operating drive motors, in combination with said current sensing devices.

2 Claims, 5 Drawing Sheets

REMOTELY CONTROLLED FIREFIGHTING APPARATUS AND CONTROL MEANS

BACKGROUND OF THE INVENTION

1. Field of the Invention

The invention relates to computer-based control systems, particularly involving remotely controlled firefighting apparatus and other apparatus containing fluid discharge devices comprising nozzle means disposed for vertical and horizontal movement.

2. Disclosure of Related Art Including Information Disclosed Under 37 C.F.R. § 1.97–1.99

Many types of control systems have been developed with respect to controlling fluid flow in various apparatus and devices. A substantial number of these systems utilize pneumatic and/or hydraulic control devices to start and stop fluid flow, vary the rate of flow, alter the direction of flow, and/or otherwise exercise control thereover. Pneumatic and/or hydraulic control systems and devices are susceptible to a variety of shortcomings, including the weight and complexity of parts, the need for control fluid to be maintained under pressure and stored, the need for controlled fluid to be conveyed through conduit and the like around the control system and controlled apparatus, the bulk and size, and relative fragility to environmental shock and impacts of such components.

Because the danger involved in firefighting, certain firefighting apparatus has been combined with control systems to the deliver fluid to the locus of a fire. See, e.g., Riggs U.S. Pat. No. 3,770,062 issued Nov. 6, 1973; Gillespie, U.S. Pat. No. 3,010,519, issued Nov. 28, 1961; Gurney, U.S. Pat. No. 2,753,003, issued Feb. 14, 1955; and Gurney, U.S. Pat. No. 2,729,296, issued Jan. 3, 1956. These pneumatic and/or hydraulic control systems are structured to provide remote manual or automatic control to ladder turrets and the like, whereby fluid flow is varied and the position and motion of the ladder turret or equivalent device is controlled. Again, these control systems essentially consist of pneumatic and/or hydraulic devices, which carry with them all of the inherent problems native to such systems and devices previously noted. Fluid motors are often used in such systems to provide movement to the various firefighting device components. Pneumatic and/or hydraulic control systems have also been configured with certain functions supplied by electrical means and devices. See, e.g., Hux et al., U.S. Pat. No. 4,007,793, issued Feb. 15, 1977, which illustrates a combined electrical/fluid control system for a nozzle mounted upon an aerial ladder.

The use of controls which were based upon electric motor control of various functions of a remote-controlled firefighting turret was also investigated. See Edwards, U.S. Pat. No. 2,729,295, issued Feb.20, 1953.

Microprocessor controlled systems have heretofore found application in connection with a wide variety of devices (see, e.g., Falcoff, U.S. Pat. No. 4,614,300, issued Sept. 30, 1986, and have apparently been used in limited applications in firefighting systems, for communications and some limited control of various firefighting equipment, including ladders, pumping equipment and the like. See, e.q., McLoughlin, U.S. Pat. No. 4,189,005, issued Feb. 19, 1980. Water cannons mounted on firefighting vehicles have seemingly made use of control systems incorporating an apparently limited, programmable computer for the performance of certain functions. See Konrad Rosengauer KG, Offenlegungsschrift DE 3620603, published Jan. 8, 1987.

Each of these systems displayed certain shortcomings that restricted their usefulness to those in the firefighting apparatus art.

SUMMARY OF THE INVENTION

The control means and remotely-controlled firefighting apparatus of the invention provide the optimal combination of features missing from the apparatus and devices heretofore available to the art.

The control means of the invention for selectively generating and converting control input information into controlling output for position and movement of controlled apparatus about at least two perpendicularly disposed axes (said controlled apparatus including a fluid discharge device comprising nozzle means disposed for horizontal and vertical movement) include:

a. Control input means, comprising:
  1. controlled apparatus position indicator means;
  2. two axis joystick means positionable for response in 45 degree increments and tiltable about its base, whereby horizontal and vertical position and movement input for said controlled apparatus may be manually selected;
  3. controlled apparatus position limit means, whereby the horizontal and vertical position and movement of said controlled apparatus may be selectively limited when automatic position and movement of said controlled apparatus is selected; and
  4. switch means for selecting manual position and movement or automatic position and movement of said controlled apparatus;

b. computer means, in communication with said control input means and responsive to controlled apparatus position and movement information and limits provided thereby, said computer means being capable of storing programs for automatic actuating and monitoring of horizontal and vertical position and movement of said controlled apparatus, said computer means comprising:
  1. microprocessor means;
  2. memory storage means for storing said programs, in communication with said microprocessor means, said storage means being selected from the group consisting of read only memory means, erasable programmable read only memory means, random access memory means, and combinations thereof;
  3. comparative means for controlled apparatus position information, whereby horizontal and vertical position and movement of said controlled apparatus may be received and compared against programmed operating parameters or manual position and movement control input; and
  4. means for generating and communicating electrical signals, in response to said program(s) or said manual position and movement control input, whereby horizontal and vertical position and movement of said controlled apparatus is altered, maintained, or controlled;

c. first controlled apparatus position determining means, in communication with said computer means, disposed to provide substantially absolute position information to said computer means by means of electrical signals with respect to the horizontal location and position of said nozzle of said fluid discharge device of said controlled apparatus;
d. first controlled electrical drive motor means for adjusting and providing movement to said controlled apparatus, whereby the horizontal positioning and movement of said nozzle of said fluid discharge device of said controlled apparatus may be controlled by means of electrical signals generated by said computer means;
e. first current sensing means, electrically interposed between said computer means and said first controlled electrical drive motor means, whereby current load on said motor may be monitored against a variable set current value and said motor selectively controlled in response thereto;
f. second controlled apparatus position determining means, in communication with said computer means, disposed to provide substantially absolute position information to said computer means by means of electrical signals with respect to the vertical location and position of said nozzle of said fluid discharge device of said controlled apparatus;
g. second controlled electrical drive motor means for adjusting and providing movement to said controlled apparatus, whereby the vertical positioning and movement of said nozzle of said fluid discharge device of said controlled apparatus may be controlled by means of electrical signals generated by said computer means;
h. second current sensing means, electrically interposed between said computer means and said second controlled electrical drive motor means, whereby current load on said motor may be monitored against a variable set current value and said motor selectively controlled in response thereto, said computer means controlling said drive motors in direct response to position input supplied from said control input means when said switch means selects manual positioning and movement, and said computer means controlling said servo motors in response to said stored programming when said switch means selects automatic positioning and movement, said automatic positioning and movement being limited in response to said limit means, if said means are engaged.

The remotely controlled firefighting apparatus of the invention includes a fluid discharge device comprising nozzle means disposed for horizontal and vertical positioning and movement and for variation of discharge stream flow for said fluid, and control apparatus for converting control input into controlling output which directs movement of said apparatus about at least two perpendicularly disposed axes, including:
a. said control apparatus comprising the control means mentioned above;
b. said controlled firefighting apparatus comprising:
  1. vertically disposed, vertical movement drive transfer means, one end being connected to and driven by said second electrically controlled drive motor means through unitary cam groove and spur gear means, which convert said drive motor rotation into substantially linear movement of said transfer means, the opposite end of which is disposed to contact said nozzle means, whereby said movement of said vertical movement drive transfer means varies the vertical positioning and movement of said nozzle means;
  2. guide bearing means in which said vertical movement drive transfer means is journalled, said bearing means comprising a substantially annular cylindrical sleeve formed from a flat strip, the opposing longitudinal surfaces of said strip having an angular edge, whereby said bearing allows for expansion and contraction through movement of said opposing longitudinal surfaces;
  3. spring washer means, disposed about the upper and lower ends of said vertical movement drive transfer means, whereby yieldable stop capability is provided, through interaction with said second current sensing means, said yieldable stops providing current buildup through said current sensing means for said control apparatus to sense and react to, thereby avoiding mechanical damage to said second electrical drive motor;
  4. elastomeric stop means, disposed to provide a stop to horizontal movement of said nozzle means, whereby yieldable stop capability is provided, through interaction with said first current sensing means, said yieldable stop providing current build up though said current sensing means for said control apparatus to sense and react to, thereby avoiding mechanical damage to said first electrical drive motor; and
c. said nozzle means comprising;
  1. an outer retainer ring, fixedly disposed to nozzle sleeve means, said ring having a substantially cylindrical bore there through, an inner face disposed perpendicularly to the axis of said bore, and a concave outer face, wherein the outer portion of said bore communicating with said outer face is substantially frustoconical in shape, the first portion of said frustoconical shape disposed closest to said outer face forming a shallower or smaller angle taken with respect to the axis of said bore than the second portion of said frusto conical shape disposed axially away from said outer face;
  2. a substantially cylindrical nozzle body, having an outwardly directed portion with a substantially cylindrical bore disposed in said body through said outwardly directed portion, and having an outer face, said nozzle sleeve means being disposed radially outwardly from the outermost surface of said nozzle body and in sliding, telescopic engagement therewith, whereby said sleeve means may be displaced axially with respect to said nozzle body and bore; a support web disposed in said substantially cylindrical bore proximate to said outer face of said bore; and a baffle fixed to said support web and disposed within said bore, said baffle being generally T-shaped in cross-section and consisting of a cylindrical, inwardly projecting portion, which flares outwardly at its outermost end, into a coaxially aligned disc portion, said disc portion and the outer portion of said bore being disposed to form an annular throat passage, through which fluid flows in exiting said nozzle body; wherein the surface of said bore is configured so as to shape the fluid flow stream as it passes there through, prior to its passage through said annular throat;
  3. rotatable turbine means, coaxially disposed to rotate about the longitudinal axis of said substantially cylindrical bore in said nozzle body, mounted upon said nozzle sleeve means and positioned inwardly from said outer retainer ring, said turbine means having a bore therethrough and and a plurality of teeth projecting radially inwardly towards the axis of said bore, whereby impingement of said fluid flow stream passing through said annular throat upon said teeth causes rotation of said turbine means and the break-up of said flow by said teeth, the combination of said outer retainer ring and said configured bore inner surface providing a substantially elliptical fluid flow pattern in fluid leaving said fluid discharge device, the widest portion of said elliptical pattern being substantially disposed in a horizontal plane.

The apparatus of the invention minimizes the need for use of heavy and/or bulky control system components, provides components capable of control operations within a temperature range of −40° F. to 140° F., provides for selectable manual control of position and movement or automatic control of position and movement, avoids the use of fragile components and allows the safe fighting of fires through application of fluid to a fire locus by use of remotely controlled firefighting apparatus.

It is therefore an object of this invention to provide novel control apparatus which controls position and movement of controlled apparatus about at least two perpendicularly disposed axes.

It is another object of this invention to provide such novel controlled apparatus wherein the controlled apparatus includes a fluid discharge device comprising nozzle means disposed for horizontal and vertical movement.

It is yet another object of this invention to provide novel, remotely controlled firefighting apparatus including a fluid discharge device comprising nozzle means disposed for vertical and horizontal positioning and movement and for variation of discharge stream flow for said fluid.

Other objects and advantages of this invention will become apparent upon reading the following detailed description and appended claims.

DESCRIPTION OF THE PREFERRED EMBODIMENTS

The preferred embodiments of the invention are most readily described by reference to the Figures, with a preferred embodiment of the remotely controlled firefighting apparatus being disclosed in FIGS. 1–11, and a preferred embodiment of the control means being disclosed in block diagram form in FIG. 12.

Figure 1:
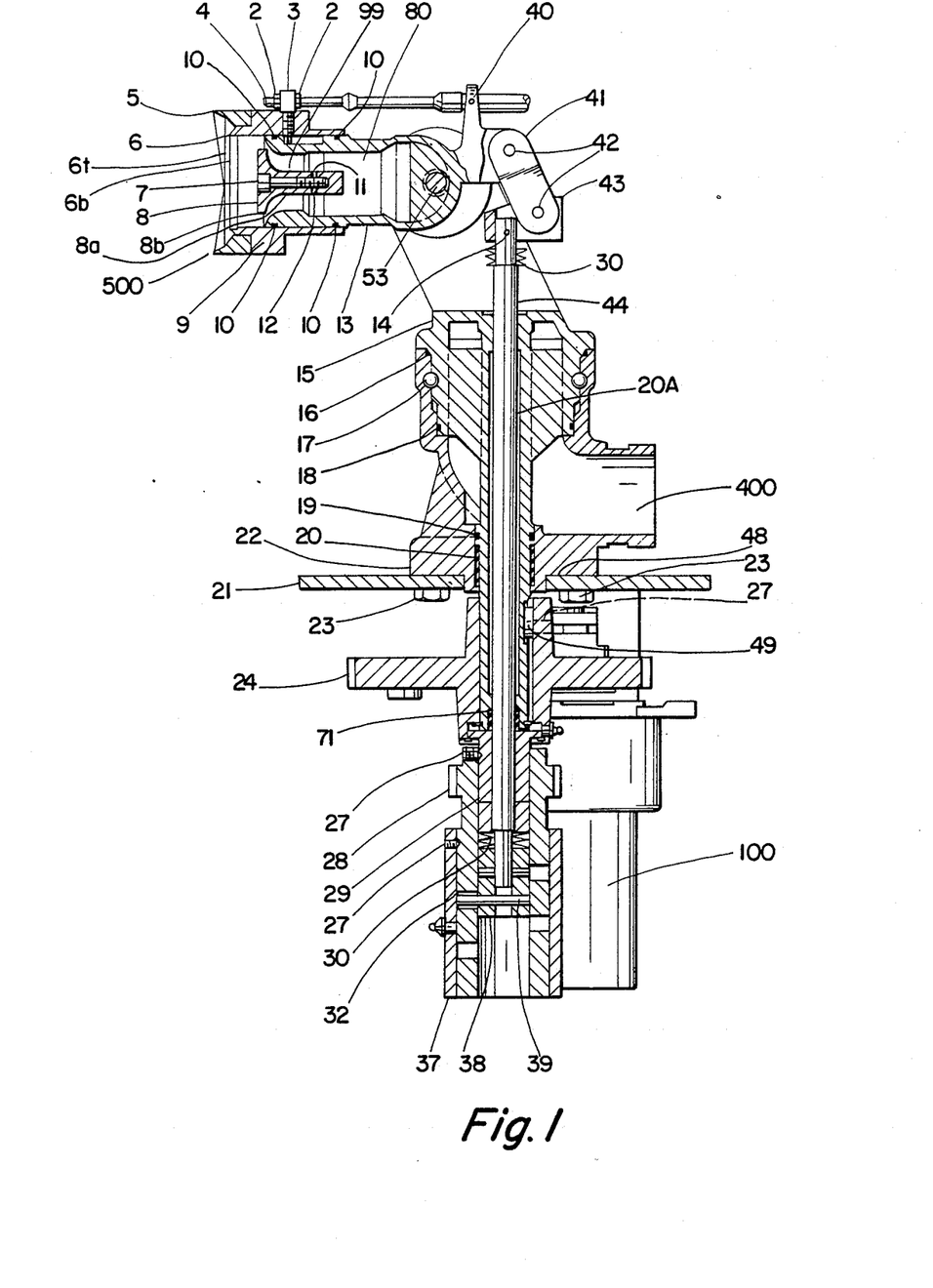
FIG. 1 is a front cross-sectional view of the remotely controlled firefighting apparatus of the invention.
Figure 2:
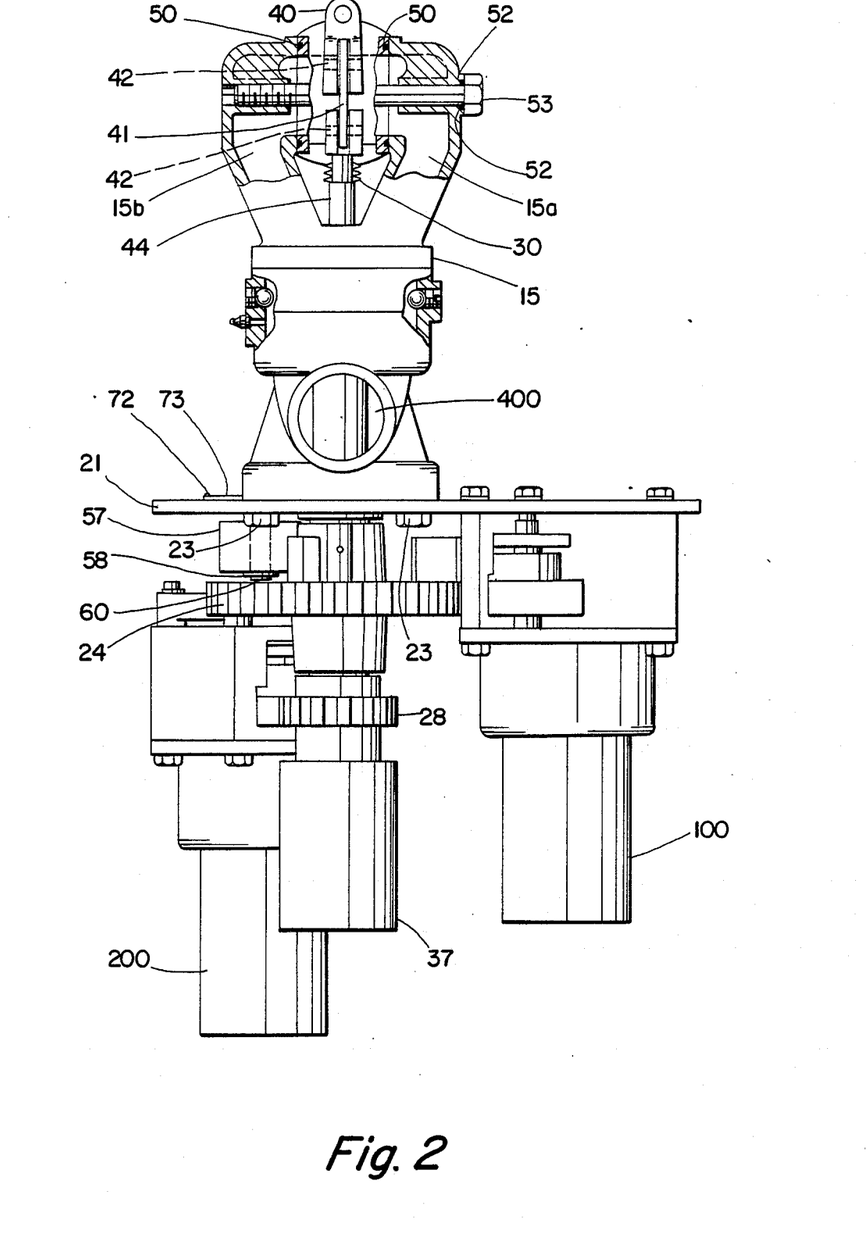
FIG. 2 is a side view of the remotely controlled firefighting apparatus of FIG. 1.
Figure 3:
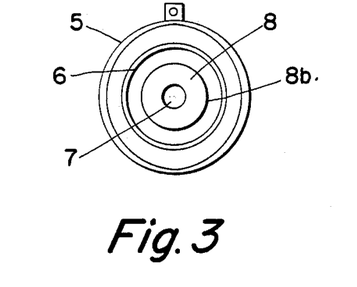
FIG. 3 is a side view of the outlet and outer retainer ring portion of the nozzle means of FIG. 1.
Figure 4:
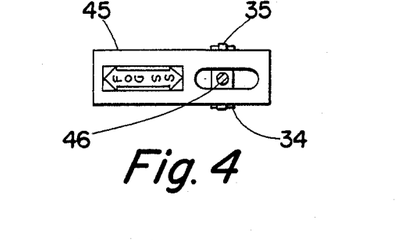
FIG. 4 is a top view of the control means for variation of the fluid discharge stream flow from the nozzle means of FIG. 1, taken along section line A—A of FIG. 1.

The preferred remotely controlled firefighting apparatus of the invention is a bumper turret, shown generally in FIGS. 1–2. A bumper turret is a fluid delivery device configured for mounting on the front or rear bumper of a firefighting vehicle, such as a pumper truck or equivalent. Bumper turret constructions are generally known to those skilled in the firefighting apparatus art, as configured for pneumatic and/or hydraulic control. The preferred embodiment is configured particularly for control by electrically operating drive motors co-acting with the preferred control means of the invention, and differs from said known bumper turret constructions in a number of key particulars.

The turret consists of several main components, disposed above and below mounting plate 21. Arranged vertically below plate 21 is rotation gear 24, which provides horizontal motion to said apparatus, driven by electrical drive motor 100 through a gear drive set 300, shown generally in FIG. 5. Spur gear 68 in gear drive set 300 is driven by said electrical drive motor 100, which gear 68 is in turn disposed in engaging relationship with rotation gear 24.

Rotation gear 24 is fixed to the downwardly depending lower cylindrical portion of siamese 15, by key 49 and set screw 27, said cylindrical portion of said siamese 15 extending through a passage in mounting plate 21. The cylindrical lower portion of siamese 15 is borne by inlet elbow 22, which elbow is fastened to mounting plate 21 by hexhead bolts 23. (Gasket 48 is located between the uppermost surface of plate 21 and the lowermost surface of inlet elbow 22, to provide a positive mating between said surfaces). A cylindrical bore is provided in said elbow 22, which extends through the passage through plate 21 (FIG. 1).

The downwardly depending cylindrical lower portion of siamese 15 passes through said bore and is journalled in guide bearing 20, with O-ring 19 providing sealing engagement with said bore above said guide bearing 20. Guide bearing 20 is most preferably made from a flat sheet or strip of Rulon, TM formed into a cylinder without fastening or otherwise securing the opposing longitudinal ends together. Most referably, said ends are angular configured, each preferably being set at an approximately 45 degree opposing and mating angle to each other, thereby allowing for expansion and contraction of the bearing. A solid sleeve bearing of the type ordinary to such an application would not provide for such expansion or contraction. The lower portion of rotation gear 24 engages drive adaptor 29.

The middle portion of siamese 15, as best seen in FIG. 1, is flared out to a substantially larger diameter than said downwardly depending cylindrical portion, the overall configuration being generally funnel-shaped.

This larger diameter portion is rotatably engaged within the upper portion of the continuous fluid passage 400 which passes through inlet elbow 22.

Ball bearings 17 engage the outer surface of the middle portion of siamese 15 and the surface of passage 400, providing for ready rotation of siamese 15 about the vertical, longitudinal axis thereof. O-rings 16 and 18, disposed above and below bearings 17, respectively, prevent fluid leakage from bore 400 to the exterior of the device.

Nozzle means 500 are fastened to and communicate with the upper portion of siamese 15 (see FIGS. 1, 2). Nozzle means 500 consists of two main components, a substantially cylindrical nozzle body or outlet tee 13 and nozzle pattern sleeve 9, which sleeve 9 is disposed radially outwardly from the outer surface of nozzle outlet tee 13, slidably engaging tee 13 in a telescoping fashion over one end thereof. Nozzle outlet tee 13 is pivotably mounted to siamese 15's uppermost portion by means of hex head bolt 53, which contacts O-rings 52. The rearwardly-extending portion of tee 13 extends between the two halves of the uppermost portion of siamese 15, members 15a and 15b, and the unthreaded portion of bolt 53 passes through said rearwardly-extending portion, through a cylindrical passage, thereby pivotably journaling tee 13 about said bolt 53. O-rings 50 are disposed between members 15a and 15b and tee 13, to prevent fluid leakage. Siamese members 15a and 15b contain fluid passages extending therethrough which are in fluid communication with passage 400 through inlet elbow 22. Fluid passages 15a and 15b are in turn in fluid communication with substantially cylindrical bore 80, which extends outwardly through a portion of tee 13 and outwardly through nozzle pattern sleeve 9.

Vertical position and movement motion is provided to tee 13, which as noted is pivotably mounted for pivotal movement about bolt 53 in members 15a, 15b of siamese 15, through vertically extending, vertical movement drive transfer means or push rod member 44. Member 44 is borne within a longitudinally extending bore which extends through the downwardly depending cylindrical lower portion of siamese 15. At its uppermost end, member 44 is pinned to elevation block 43, which in turn bears one end of elevation link 41, which is pinned to block 43 by one of roll pins 42. The opposite end of elevation link 41 is pinned by the other of roll pins 42 to a rearwardly projecting boss on tee 13. Elevation block 43 and link 41 transmits motion from member 44 to tee 13, causing tee 13 to pivot upwardly or downwardly about the horizonal axis provided by bolt 53.

Figure 5:
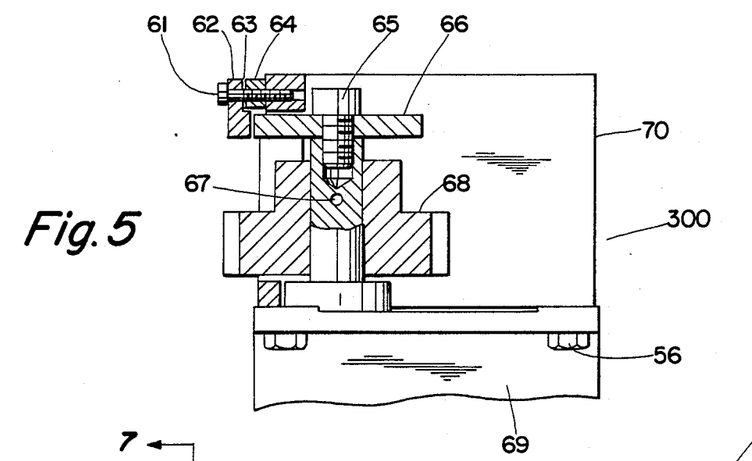
FIG. 5 is a detail view of the geardrive components of FIG. 2.
Figure 6:
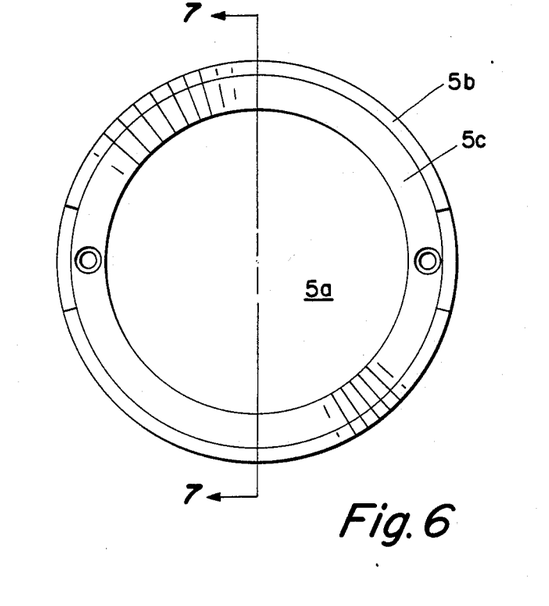
FIG. 6 is a detail view of the outer retainer ring of the nozzle means of FIG. 1.
Figure 7:
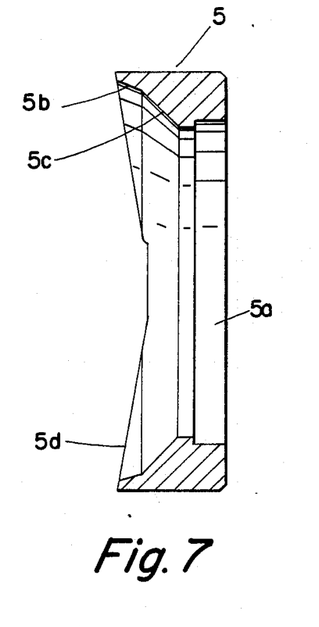
FIG. 7 is a cross-sectional view of the outer retainer ring of the nozzle means of FIG. 1, taken along section line A—A of FIG. 6.
Figures 8, 9:
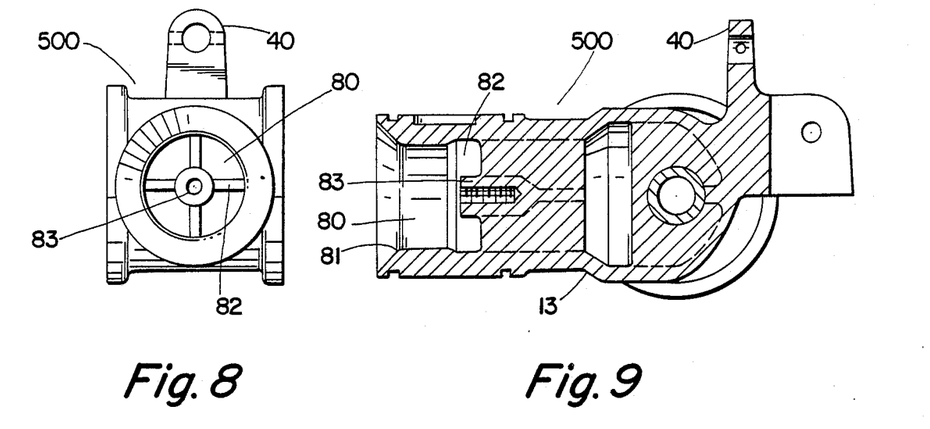
FIG. 8 is a side view of the outlet portion of the nozzle means of FIGS. 1 and 9.
FIG. 9 is a front cross-sectional view of the nozzle means of FIG. 1.
Figure 10:
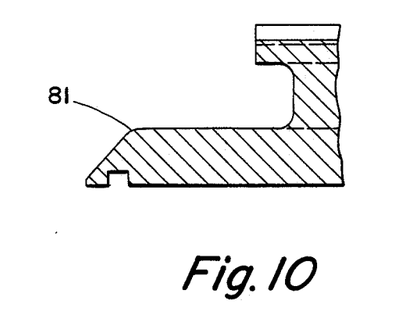
FIG. 10 is a detail view of the exit edge configuration of the bore in the nozzle means of FIGS. 1 and 9.
Figure 11:
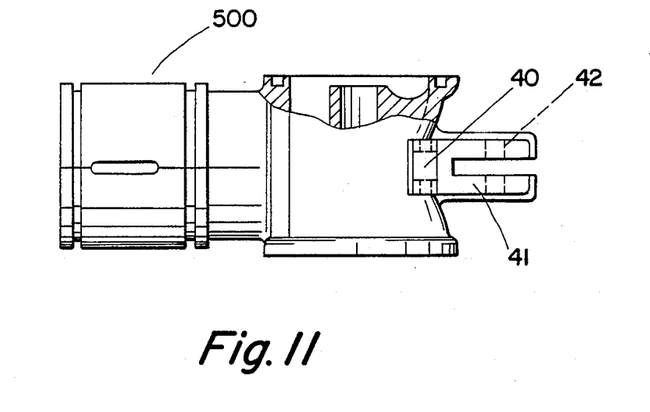
FIG. 11 is a top, partial sectional view of the nozzle means of FIGS. 1 and 9.

Motion is imparted to member 44 in the first instance by means of electrically driven drive motor 200 and a second gear set 300 shown generally in FIG. 5. Motor 200 drives a second spur gear 68, which drivingly engages elevation gear 28 (FIG. 1). Elevation gear 28 is fastened to member 44 through set screw 27 and drive adaptor 29. Elevation gear 28 comprises, in a unitary part, both a cam groove and a spur gear, which matches second spur gear 68. Rotation of gear 28 is translated to vertical movement of member 44 by virtue of said cam groove, which is cut in a spiral or helical path. To provide ease of said vertical movement, member 44 is journalled in in "Nyliner" bearing 71 and in longitudinally axially extending guide bearing 20a, said guide bearing 20a having the same construction and preferred material as guide bearing 20. Cam roller 32, borne by axle 39, follows in said cam groove on rotation of gear 28, all within cam jacket 37, which is affixed to gear 28 by a set screw 27.

The rotation of member 44 is resisted by the link pin 14 as said spur gear/cam groove member 28 rotates, serving to maintain substantially linear motion in member 44. Upper and lower ends of member 44 pass through spring washers 30, which are engaged by shoulders at the extremities of said member 44 (FIG. 1). These washers are preferably "Belleville" spring washers, which function as a part of a "soft stop" system. The spring washers serve to help create gradual motor current increase as the end of travel is approached, rather than an abrupt increase when the end of travel is reached. This increase is sensed by adjustable current sensing circuitry 1016 (see FIG. 12), in sufficient time to react and cease motor movement without the abrupt current use of a solid stop.

Similarly, an elastomeric spring member 57, which is fastened to the underside of plate 21 by stop pin 60, is provided to damp and cushion against over-rotation in a horizontal plane of rotation gear 24.

Nozzle means 500, as noted above, consists of two major components. Pattern sleeve 9, which slidably engages the outer surface of member 13, also contacts two pairs of O-rings 10 (FIG. 1) mounted in said outer surface, to provide a substantially fluid tight fit therebetween. The relative motion of sleeve 9 with respect to member 13 is controlled by pattern control cable set 4, which is affixed at its inner end to sleeve 9 with nut 2 through cable eye 3. The outer covering of cable set 4 is pinned via dog point set screw 40 to a projecting boss which extends upwardly from the rear portion of tee 13. The opposite outer end of said cable set 4, which may extend in length to that necessary to place the control mechanism in a location most convenient to the operator, is fastened to pattern control bracket 45, and the inner end of said cable set 4 is fastened to pattern control handle 46, which is pivotably mounted to said bracket 45 by clevis pin 34 and pivot pin 35 (see FIG. 4). By manipulation of said handle 46, the sleeve 9 is slid towards or away from the outermost end of member 13. Alternatively, electrical motor means may be provided to impart said axial movement of sleeve 9.

Bore 80, which extends through a portion of tee 13, and is in fluid communication with members 15a and 15b of siamese 15 and, in turn, inlet elbow 22, has an internal configuration which constitutes a built-in stream flow shaper. Said configuration shapes the flow of fluid through bore 80, such that it forms a desired pattern for interaction with the annular throat formed by the baffle 8 and the flared exit portion 81 of bore 80.

Bore 80 contains support web 82, which contains a hub with an internally threaded bore 83. Baffle 8 is mounted to said web by bolt 7, which is threadably engaged with bore 83. Baffle 8 comprises a substantially cylindrical, inwardly extended portion 8a which has a bore through which bolt 7 extends, which flares at its outward extent to a disc-shaped portion 8b, such that the baffle is substantially T-shaped in cross-section. The disc shaped portion 8b of baffle 8 and the outwardly flaring exit portion 81 of bore 80 form an annular throat passage 99 therebetween, which forces flowing fluid exiting bore 80 into a radial outwardly expanding but substantially laminarly flowing stream, which, however, maintains the general flow shape imparted to it by the internal configuration of bore 80.

Sleeve 9 bears on its outermost end a turbine retaining ring 5, which retains turbine 6 for rotation about the longitudinal axis of bore 80. Rotation of turbine 6 which has a bore 6b therethrough occurs when the relative position of sleeve 9 with respect to tee 13 is such that the shaped stream which flows through annular throat passage 99 impinges upon turbine 6 and its inwardly projecting teeth means 6t, causing rotation and the breaking up of said stream into a fog or mist flow. If sleeve 9 is otherwise positioned, the fluid flow will not impinge on turbine 6 in such manner as to give rotation, and a substantially steady stream flow will result.

Ring 5 (FIGS. 6-7) provides flow shaping to the exiting fluid stream, whether in a fog or mist flow or a steady stream flow. The outer portion of the bore 5a is substantially frusto-conical in shape, and comprises two distinct portions, 5b and 5c. Portion 5c is more widely flaring in the flow plan than is portion 5b. Stated otherwise, portion 5b is shallower in angle than portion 5c, when taken from the axial centerline of bore 5a. Axially, portion 5c is deeper than portion 5b. Ring 5 also has a particular shape to its outermost face, 5d. Face 5d is substantially concave when viewed from the side, making a slightly acute angular displacement when taken from the vertical when proceeding outwardly from the axis of bore 5a to the edge thereof. Inner face 5c of ring 5 is disposed perpendicularly to the axes of said bore, presenting an annular aspect with bore 5a.

The effect of the particular configuration of ring 5, taken with the internal configuration of bore 80, is to impress an elliptical shape upon the fluid flow exiting said nozzle means, with the broadest part of the ellipse being aligned in a substantially horizontal plane, under both fog or mist and steady stream flow conditions. When a bumper turret is provided with such an elliptical flow pattern, little fluid is wasted by impingement upon the ground or by dissipation into the air, the visibility and safety of the firefighting equipment operator such as the driver of a firefighting vehicle having mounted thereon the firefighting equipment of the invention, is greatly improved, and the maximum amount of fluid is directed to the locus of the fire. Even when turbine 6 is engaged by the flow and a fog or mist flow is generated, elliptical shaping still is provided by at least ring 5.

Figure 12:
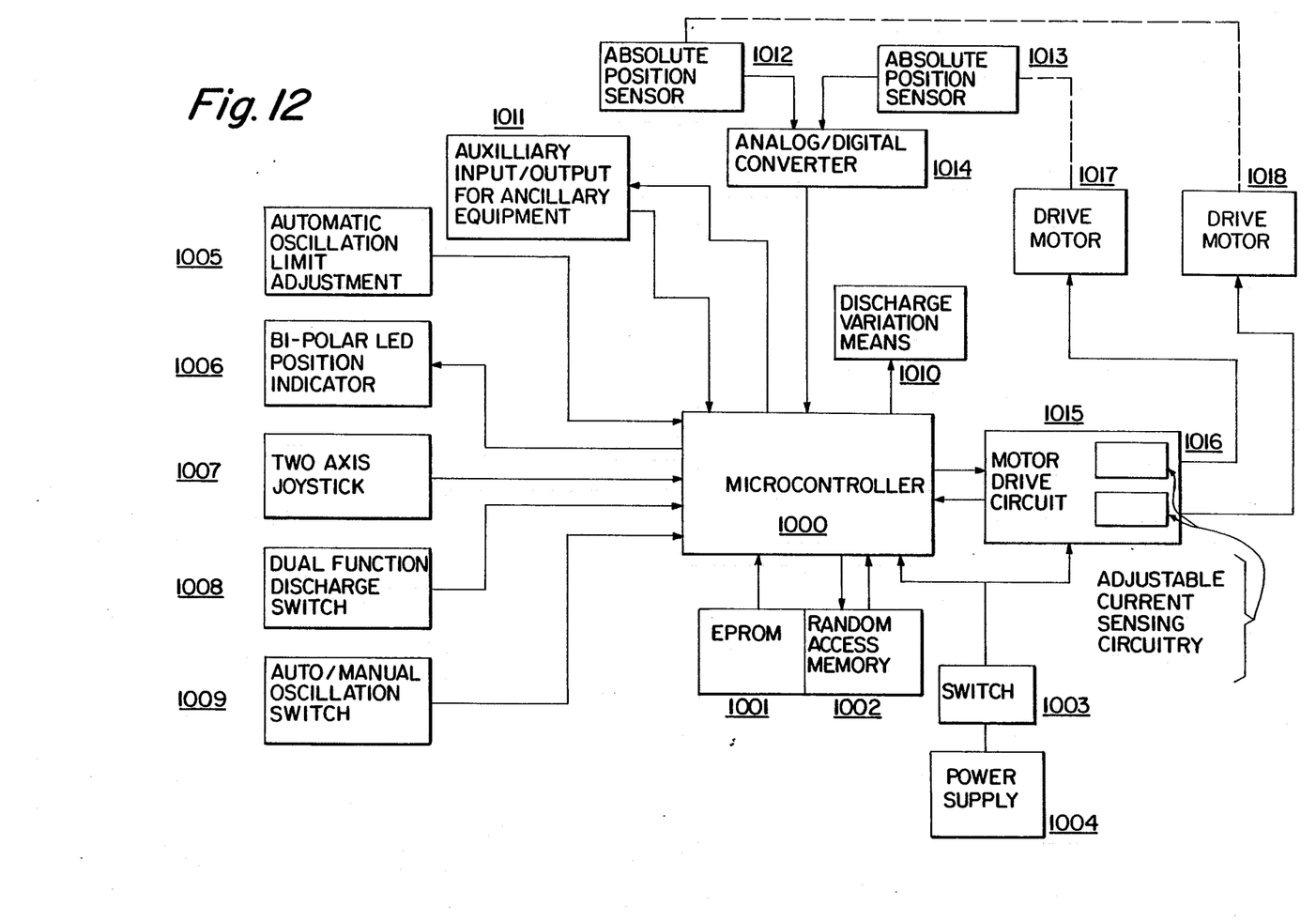
FIG. 12 is a block diagram of the control means of the invention.

The preferred embodiment of the control apparatus of the invention is illustrated in FIG. 12. Generally, the control system is designed to accept four quadrant on/-off input from the control apparatus, which is not a proportional input, and convert it into controlled two axis movement. (Modifications to take input in proportional form is readily accomplished, however, if desired).

Microcontroller 1000 may comprise any of the several well-known 8, 16 or 32 bit microprocessors. Preferably, a 16 or 32 bit microprocessor will be used. The microprocessor is capable of accepting direct manual position and movement information/data, converting it to control output data and thereafter controlling the position and movement of the controlled apparatus.

Alternatively, the microprocessor will operate under stored or input programming to automatically position and move said controlled apparatus. Any of the well-known computer storage means may be used to store such programs including random access memory devices 1002, which include RAM semiconductor devices, and erasable programmable read only memory devices 1001, which comprise EPROM semiconductor devices. Other forms of read only memory may also be used. Combinations of such memory devices may also be beneficial. These devices may be preprogrammed in firmware form with set automatic position and movement programs, or preprogrammed by loading desired programs into said memory means, or means may be provided to allow reprogramming or initial programming in the manner well known to those skilled in the art.

In the alternative, an all-in-one microprocessor chip with firmware or other programming permanently impressed thereon may also be used.

The control apparatus of the invention will operate with an output power source 1004 supplying from 12 to 24 volts dc, switch means 1003 being provided to cut the supply of power when the unit is not in use.

The microprocessor 1000 is provided with a number of inputs from a variety of devices. Two axis joystick 1007 is the main position and movement control input means, for manual operation of the system. When switch 1009 is in the manual operation position, the two axis joystick will provide direct control input for horizontal and vertical position and movement to microprocessor 1000. When switch 1009 is in the automatic operation position, joystick 1007 will be disconnected, and automatic oscillation limit adjustment switches 1005 will be engaged. While operation will proceed generally under the programming read from memories 1001, 1002 and executed by the microprocessor, the switches 1005 will serve to limit the position and movement of the controlled apparatus, principally in horizontal motion, to the extent that they are engaged to provide limiting function.

Bi-polar LED position indicators 1006 are used in tandem with both two axis joystick 1007 and, alternatively, automatic oscillation limit adjustment switches 1005. The dual color LED's provide, in the preferred mode, red and green display when lit. The LED's are preferably mounted in a semi-circular pattern about the base of the two axis joystick 1007 with the arc matching the total travel of the controlled apparatus in either the horizontal or vertical direction. The bi-polar LED's are preferably spaced every 12 degrees.

In manual operation, the LED's will each show green, except for the one indicating the direction of the nozzle means on the controlled apparatus, which will display red. As the nozzle means changes direction, the LED's will sequentially change color from green to red to show the position of the device, only one LED being lit at any given time.

In the automatic mode, pointers which comprise part of the automatic oscillation limit adjustment means 1005 are used to adjust the width and position of the arc through which the device is to move or oscillate if an oscillating motion is provided. The LED's within the operating arc will be lit green and those outside the operating arc will be red. Within the green operating range, the position of the nozzle means of said controlled apparatus will be indicated by a red LED, similar to the manual operation.

As an alternate feature, dual function discharge switch 1008, with accompanying discharge variation means 1010, may be provided to effect, by electrical means, variation between steady stream fluid discharge and/or fog or mist discharge, in lieu of the use of mechanical means such as pattern control handle 46. Further, auxiliary inputs and outputs 1011 for other ancillary equipment may be provided.

The preferred embodiment of the control apparatus of the invention uses two absolute position sensors 1012, 1013 for determination of horizontal and vertical position and movement, respectively, of the controlled apparatus. These sensors 1012, 1013 provide a continuous indication of position, which is fedback to microprocessor 1000, through analog/digital convertor 1014. The control system is versatile enough to accept direct digital information if digital sensors are used or, in the alternative, to use converter 1014 and resulting converted analog to digital information, to provide the necessary information for microprocessor 1000 to compare actual against programmed position and movement for control and correction purposes. If analog sensors are used, multiplexer
means are included within converter means 1014, and an R-2R ladder and comparator to convert the position signal to a digital form is used.

When the automatic operation mode is selected via switch 1009, one of several stored programs may be selected. Such selection may be effected, for example, by provision of jumper means, which may be manipulated with respect to the microprocessor 1000 and its related memories to select a desired stored program.

Once the microprocessor produces control output in the form of electrical signals, those signals are passed to motor drive circuits 1015, one for each of the electrical drive motors 1017, 1018 in the system. To protect the drive motors, it is preferable to provide adjustable current sensing circuitry 1016 for each of said motors. If an overcurrent situation or end position is sensed by circuits 1016, the appropriate drive motor will be shut off before any damage results.

After passing through said sensing circuitry 1016, the electrical control output signals provided by microprocessor 1000 are applied to horizontal and vertical position and movement drive motors 1017, 1018.

These electrical drive motors are of the type known to the art, and must be of sufficient rating to rapidly position heavy firefighting controlled apparatus. If necessary for the motor drive circuitry 1015 and motors 1017, 1018, a pulse width modulated output may be provided, for adjustable motor control.

While particular embodiments of the invention, and the best mode contemplated by the inventor for carrying out the invention, have been shown, it will be understood, of course, that the invention is not limited thereto since modifications may be made by those skilled in the art, particularly in light of the foregoing teachings. It is, therefore, contemplated by the appended claims to cover any such modifications as incorporate those feature which constitute the essential features of these improvements within the true spirit and scope of the invention.

We claim:

1. Control means for selectively generating and converting control input information into controlling output for position and movement of controlled apparatus about at least two perpendicularly disposed axes, said controlled apparatus including a fluid discharge device comprising nozzle means disposed for horizontal and vertical movement, comprising:

A. Control input means, comprising:
 a. controlled apparatus position indicator means;
 b. two axis joystick means positionable for response in 45 degree increments and tiltable about its base, whereby horizontal and vertical position and movement input for said controlled apparatus may be manually selected;
 c. controlled apparatus position limit means, whereby the horizontal and vertical position and movement of said controlled apparatus may be selectively limited when automatic position and movement of said controlled apparatus is selected; and
 d. switch means for selecting manual position and movement or automatic position and movement of said controlled apparatus;

B. computer means, in communication with said control input means and responsive to controlled apparatus position and movement information and limits provided thereby, said computer means being capable of storing programs for automatic actuating and monitoring of horizontal and vertical position and movement of said controlled apparatus, said computer means comprising:
 a. microprocessor means;
 b. memory storage means for storing said programs, in communication with said microprocessor means, said storage means being selected from the group consisting of read only memory means, erasable programmable read only memory means, random access memory means, and combinations thereof;
 c. comparative means for controlled apparatus position information, whereby horizontal and vertical position and movement of said controlled apparatus may be received and compared against programmed operating parameters or manual position and movement control input; and
 d. means for generating and communicating electrical signals, in response to said program(s) or said manual position and movement control input, whereby horizontal and vertical position and movement of said controlled; apparatus is altered, maintained, or controlled;

C. first controlled apparatus position determining means, in communication with said computer means, disposed to provide substantially absolute position information to said computer means by means of electrical signals with respect to the horizontal location and position of said nozzle of said fluid discharge device of said controlled apparatus;

D. first controlled electrical drive motor means for adjusting and providing movement to said controlled apparatus, whereby the horizontal positioning and movement of said nozzle of said fluid discharge device of said controlled apparatus may be controlled by means of electrical signals generated by said computer means;

E. first current sensing means, electrically interposed between said computer means and said first controlled electrical drive motor means, whereby current load on said motor may be monitored against a variable set current value and said motor selectively controlled in response thereto;

F. second controlled apparatus position determining means, in communication with said computer means, disposed to provide substantially absolute position information to said computer means by means of electrical signals with respect to the vertical location and position of said nozzle of said fluid discharge device of said controlled apparatus;

G. second controlled electrical drive motor means for adjusting and providing movement to said controlled apparatus, whereby the vertical positioning and movement of said nozzle of said fluid discharge device of said controlled apparatus may be controlled by means of electrical signals generated by said computer means; and H. second current sensing means, electrically interposed between said computer means and said second controlled electrical drive motor means, whereby current load on said motor may be monitored against a variable set current value and said motor selectively controlled in response thereto, said computer means controlling said drive motors in direct response to position input supplied from said control input means when said switch means selects manual positioning and movement, and said computer means controlling said drive motors in response to said stored programming when said switch means selects automatic positioning and movement, said automatic positioning and movement, if said means are engaged.

2. A remotely controlled firefighting apparatus which includes a fluid discharge device comprising nozzle means disposed for horizontal and vertical positioning and movement and for variation of discharge stream flow for said fluid, and control apparatus for converting control input into controlling output which directs movement of said fluid discharge device about at least two, perpendicularly disposed axes, wherein:

A. said control apparatus is comprised of the control means of claim 1;

B. said controlled firefighting apparatus is further comprised of:
  a. vertically disposed, vertical movement drive transfer means, one end being connected to and driven by said second electrically controlled drive motor means through unitary cam groove and spur gear means, which convert said drive motor rotation into substantially linear movement of said transfer means, the opposite end of which is disposed to contact said nozzle means, whereby said movement of said vertical movement drive transfer means varies the vertical positioning and movement of said nozzle means;
  b. longitudinally axially extending guide bearing means in which said vertical movement drive transfer means is journalled, said bearing means comprising a substantially annular cylindrical sleeve formed from a flat strip, the opposing longitudinal surfaces of said strip having an angular edge, whereby said bearing allows for expansion and contraction through movement of said opposing longitudinal surfaces;
  c. spring washer means, disposed about the upper and lower ends of said vertical movement drive transfer means, whereby yieldable stop capability is provided, through interaction with said second controlled apparatus position determining means, said yieldable stops providing current buildup through said position determining means for said control apparatus to sense and react to, thereby avoiding mechanical damage; and
  d. elastomeric stop means, disposed to provide a stop to horizontal movement of said nozzle means, whereby yieldable stop capability is provided, through interaction with said first controlled apparatus position determining means, said yieldable stop providing current build up through said position determining means for said control apparatus to sense and react to, thereby avoiding mechanical damage; and C. said nozzle means is further comprised of:
  a. an outer retainer ring, fixedly attached to nozzle sleeve means, said ring having a substantially cylindrical bore therethrough, said bore having a longitudinal axis, an inner face disposed perpendicularly to the axis of said bore, a concave outerface, and an inner part and an outer portion disposed closest to said outerface, wherein said outer portion of said bore communicating with said outer face is substantially frustoconical in shape, said frustoconical outer portion of said bore further comprising a first and a second portion therein, the first portion of said frustoconical outer portion is disposed closest to said outer face and forms a shallower or smaller angle taken with respect to the axis of said bore than the second portion of said frustoconical outer portion, wherein said second portion of said frustoconical outer portion is disposed axially away from said outer face;
  b. a substantially cylindrical nozzle body, having an outwardly directed portion with a substantially cylindrical bore disposed in said body through said outwardly directed portion, and having an outer face, said bore having a longitudinal axis, an inner portion and an outer portion, said nozzle sleeve means being disposed radially outwardly from the outermost surface of said nozzle body and in sliding, telescopic engagement therewith, whereby said sleeve means may be displaced axially with respect to said nozzle body and bore; a support web disposed in said substantially cylindrical bore proximate to said outer face of said bore; and a baffle fixed to said support web, and disposed within said bore, said baffle being generally T-shaped in cross-section and consisting of a cylindrical, inwardly projecting portion, which has an inner most and an outermost end, which flares outwardly at its said outermost end into a coaxially aligned disc portion, said disc portion and the outer portion of said bore being disposed to form an annular throat passage, through which fluid flows in exiting said nozzle body, wherein the inner surface of said bore is configured so as to shape the fluid flow stream as it passes therethrough prior to its passage through said annular throat passage; and
  c. rotatable turbine means, coaxially disposed to rotate about the longitudinal axis of said substantially cylindrical bore in said nozzle body, mounted upon said nozzle sleeve means and positioned inwardly from said outer retainer ring, said turbine means having a bore therethrough and a plurality of teeth projecting radially inward towards the axis of said bore, whereby impingement of said fluid flow stream passing through said annular throat upon said teeth causes rotation of said turbine means and the break-up of said flow into a fog or mist flow by said teeth, the combination of said outer retainer ring and said configured bore inner surface providing a substantially elliptical fluid flow pattern in fluid leaving said fluid discharge device, the widest portion of said elliptical pattern being substantially disposed in a horizontal plane.

* * * * *